United States Patent [19]
McKay et al.

[11] Patent Number: 4,808,234
[45] Date of Patent: Feb. 28, 1989

[54] CLEANER ASSEMBLY FOR AIR FILTERS

[75] Inventors: Roy D. McKay; Reid W. McKay; Daniel A. Winfield, all of Wildwood, Canada

[73] Assignee: McWinn Filter Services Ltd., Edmonton, Canada

[21] Appl. No.: 637,811

[22] Filed: Aug. 6, 1984

[51] Int. Cl.⁴ ............................................. B08B 5/04
[52] U.S. Cl. ..................................... 134/21; 134/144; 134/155; 134/167 R; 210/230; 210/354; 15/312 R; 15/345
[58] Field of Search .................. 55/302, 290, 294; 134/167, 21, 144, 155; 15/312, 320, 345; 210/354, 230, 242

[56] References Cited
U.S. PATENT DOCUMENTS 3,345,805 10/1967 Sherrill ............................ 55/290
3,606,897 9/1971 Tobin, III et al. ............... 134/86
3,620,234 11/1971 Everroad ......................... 134/86
3,958,296 5/1976 Fell .................................. 55/294
3,977,847 8/1976 Clark ............................... 55/294
4,299,245 11/1981 Clapper .......................... 134/144

Primary Examiner—Curtis R. Davis
Assistant Examiner—Sharon T. Cohen
Attorney, Agent, or Firm—Ernest Peter Johnson

[57] ABSTRACT

As a preliminary step, the dirty filter is dried to remove substantially all moisture from the dust on the filter. The filter is then spun in a closed cabinet. Simultaneously, a jet of pressurized air is reciprocated in close proximity along the inner surface of the filter. Also at the same time, suction is maintained on the cabinet, to remove dust-laden air and assist in the dislodging of the dust from the filter paper. By the combined actions of spinning, close-coupled reverse air jetting, and suction, the dust can substantially all be removed from the dirty filter.

7 Claims, 5 Drawing Sheets

CLEANER ASSEMBLY FOR AIR FILTERS

BACKGROUND OF THE INVENTION

Field of the Invention

This invention relates to a method and apparatus for cleaning dust-laden, generally tubular air filters. The invention involves spinning the filter within a closed cabinet, while simultaneously reciprocating a close-coupled reverse air jet along its inner surface and applying suction to its outer surface, to dislodge the dirt accumulated on the filter paper.

Air Filters

As stated, the invention has to do with cleaning air filters. More particularly, the invention has been developed in connection with the large, cylindrical, hollow filters used in conjunction with the motors of heavy equipment, such as ore trucks, bulldozers and the like.

This type of filter comprises an annular, perforated, metal frame containing a permeable pleated paper filter medium. In the use of the filter, air is drawn into the motor through the permeable filter wall and thence through the central filter bore. Dirt entrained in the air is separated and accumulates on the exterior surface of the filter paper; the cleaned air passes into the motor.

The filters quickly become dirty and plugged in the dusty environment in which they are used. It is not uncommon for a newly installed, clean filter to become non-useable within 1-3 weeks.

When this occurs, the user must remove the soiled filter and replace it with a clean one.

These filters are expensive. They commonly cost several hundreds of dollars. Therefore, it is self-evident that cleaning the used filters to render them re-useable is desirable.

Commerical Prior Art

The only technique used commercially, to applicants' knowledge, is a "wet" process. It involves hanging a number of the filters from a wire grid and then suspending them for a pre-determined period in a bath of water containing surfactants. After the bath, the filters are removed and hosed down with water. As a last step, they are dried using a reverse air flow (i.e. an air flow moving outwardly from the centre bore of the filter, through its wall).

This "wet" process is characterized by certain disadvantages. Firstly, the water bath carries dirt to the inside surface of the filter paper, where it is not wanted. Secondly, contacting the filter paper with water results in the paper becoming somewhat brittle on subsequent drying, so that it becomes fragile and can easily break. And thirdly, the procedure often causes pinholes to appear in the paper, which soon render it defective for its intended purpose.

Because of these problems, the filters can only be so cleaned perhaps 2-3 times, after which they are commonly discarded.

Development of the Present Invention

Wishing to develop a better technique, applicants began by washing filters in water in a household clothes washer, in the course of which the filter was spun. The procedure was unsuccessful, as the filter paper was damaged. However, it was noted that spinning was useful in dislodging some of the dirt.

Applicants then constructed a spinner having spaced plates which could be tightened, to friction grip the end surfaces of the filter. This spinner was used to spin dry, soiled filters at varying speeds. There was some success in removing the larger dirt particles, but the fine particles, in particular, were retained by the filter paper.

Applicants then chose to assist the dry spinning with a reverse air flow. An open-ended air hose was inserted into the filter bore and simultaneous spinning and reverse air flowing was tried. It was found that good cleaning of the filter wall would occur in one localized area, but then most of the air would begin channelling through that spot. As a result, inordinately large volumes of air were required to increase the extent of the cleaned area.

At this point, applicants chose of bring a relatively low volume of pressurized air flow into close proximity with the filter wall. To accomplish this, a relatively long, hollow cylinder was mounted on the end of a reciprocable hollow shaft connectable to an air compressor. The cylinder was provided with a longitudinally extending line of radially directed nozzle outlets. The nozzles were positioned close to the inner surface of the filter. Stated otherwise, the air jets produced by the nozzles were "close coupled" to the filter wall. Typically, the nozzle outlets were spaced about 1" from the filter wall.

A cabinet was also provided, to enclose the filter and the nozzle cylinder. A vacuum unit was attached to an outlet from the cabinet, to exert suction on the exterior of the filter and draw off the dust-laden air.

This unit thus incorporated:

spinning of the filter;

close coupled, localized reverse air flows or jets which could be moved along the length of the rotating filter wall, to ensure that the whole surface was subjected to the localized flows;

and suction on the outside of the filter, to draw off dust-laden air and assist in dislodging the dirt from the paper surface.

It was found that this combination was effective to clean the wall. A key factor was that now the air supplied was no longer so free to move to a clean spot along the filter wall and channel therethrough. Instead, the air supplied was now "controlled", in the sense that it was focussed in close proximity to a small area of dirty wall—in this circumstance, the jet of air would tend to pass through that area and remove the dust on the outside surface of the filter medium.

While the basics of the system were now established, there were still some secondary problems to be solved.

More particularly, centering of the soiled filters in the apparatus was difficult to consistently and quickly carry out. The central axis of the filter had to substantially coincide with the axis of the nozzle assembly, otherwise the close-coupled nozzles were liable to rip into the filter wall when the latter was spun. As there are many sizes of filters, it was necessary that centering means be provided and that they be adjustable.

In early versions of the assembly, a plurality of upstanding lugs or pins in a circular pattern were provided on the filter gripping plates, to engage the outer vertical side surface of the filter at points spaced around its circumference. These lugs were individually moveable radially and could be tightened down to lock them in place in tight abutment against the filter end. However, it was always a guessing game as to whether the axis of the filter was properly centered.

This problem was overcome by providing an assembly in which the lugs are simultaneously moved radially at the same rate, so that their centre remains constant.

Another secondary problem was that the fine dust particles were very difficult to dislodge from the filter. It was eventually discovered that preliminary drying of the filter and its attached solids would successfully convert the fines to a condition in which they could relatively easily be dislodged.

Patent Prior Art

In a search of the prior art U.S. patents, three of interest were located. These are: U.S. Pat. No. 3,998,656 issued to Grotto; U.S. Pat. No. 2,591,198, issued to Ringe; and U.S. Pat. No. 3,958,296 issued to Fell.

Grotto is the most pertinent, in that he shows the combined actions of spinning, reverse air flow and external suction. However Grotto does not incorporate a close-coupled, localized air flow in his cleaning action.

Ringe shows a long, rotating vane feeding air to reverse flow it through a stationary filter. Ringe fails to incorporate longitudinally moving, localized air flow and simultaneous spinning of the filter.

Fell shows a central air supply shaft and radial nozzles. However he too fails to incorporate spinning.

SUMMARY OF THE INVENTION

In accordance with the invention, therefore, there is provided a cleaner system consisting of a method and apparatus and incorporating the simultaneously applied actions of:

spinning the filter at a controlled rate;

applying a localized, close-coupled jet of air to the inner surface of the spinning filter and moving one of the jet and the filter relative to the other longitudinally, so that substantially all of the filter wall is subjected to the concentrated reverse air flow; and applying suction to the exterior of the filter, to draw off the dust-laden air.

In an apparatus aspect, the invention is a cleaner assembly for dry cleaning a generally tubular air filter having a pleated paper filter medium therein on which dust has collected, comprising: (a) means for spinning the filter about its longitudinal axis; (b) means for applying one or more localized, close-coupled jets of pressurized air generally radially to the inner surface of the spinning filter, to dislodge the dust attached to the exterior of the filter paper and immediately in the path of said jet; (c) means for supplying pressurized air to said means (b); (d) means for reciprocating one of the means (b) and the filter, relative to the other longitudinally, whereby substantially all of the filter wall may be subjected to reverse air flow; and (e) means for applying suction to the exterior of the spinning filter during air cleaning, to draw off dust-laden air.

In another aspect, the invention is a method for cleaning dust from the outer surface of the pleated paper filter medium of a generally tubular air filter comprising: (a) drying the filter with dry air until the dust is substantially dry; (b) spinning the dry filter about its longitudinal axis in a cabinet; (c) applying a localized, close-coupled air jet to the inside surface of the spinning filter to clean a small area of the filter wall directly in the path of the jet, and moving one of the jet and the filter longitudinally relative to the other, so that the jet is applied to all or at least a major part of the surface of the filter wall; and (d) simultaneously suctioning dusty air from the cabinet.

DETAILED DESCRIPTION OF THE PREFERRED EMBODIMENT

The Cabinet

Figure 1:
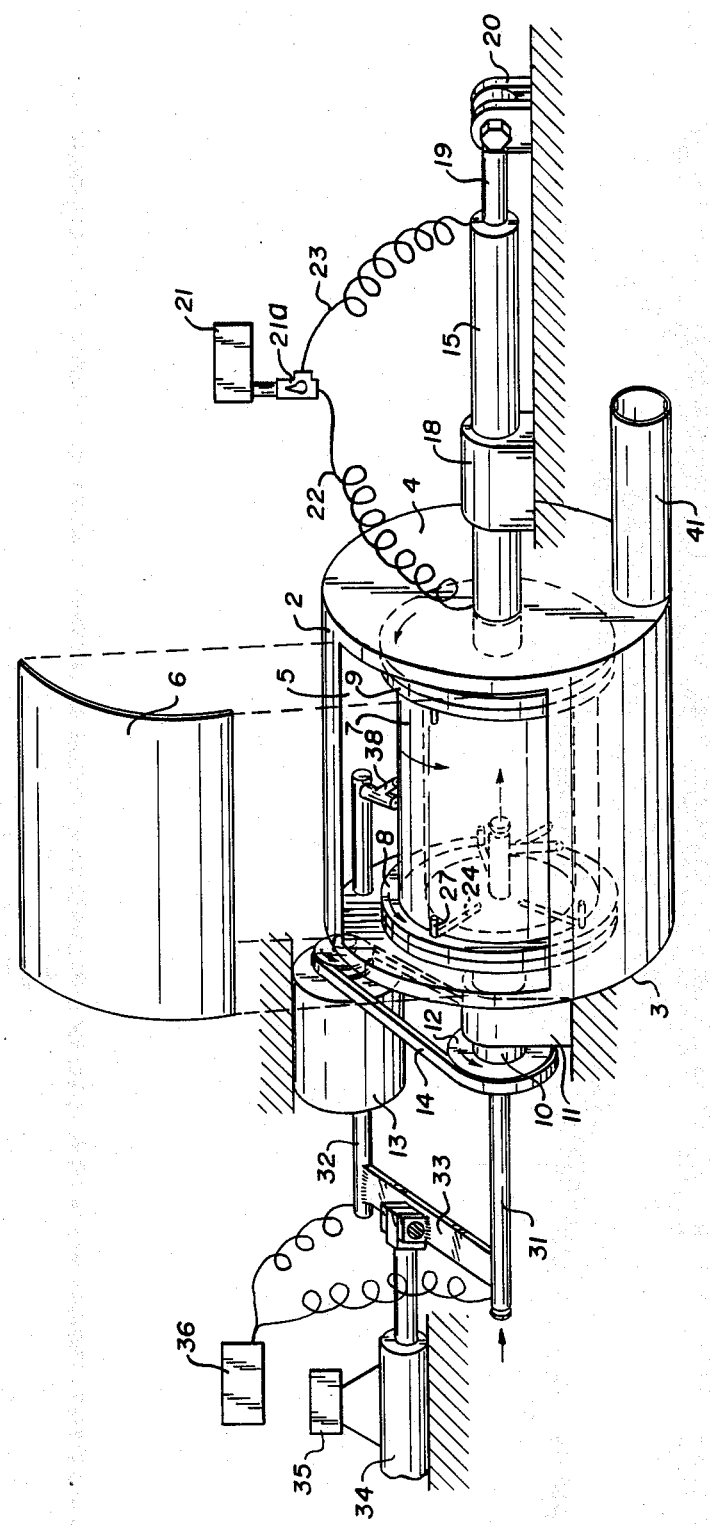
FIG. 1 is a partly schematic perspective view of the cleaner assembly.
Figure 2:
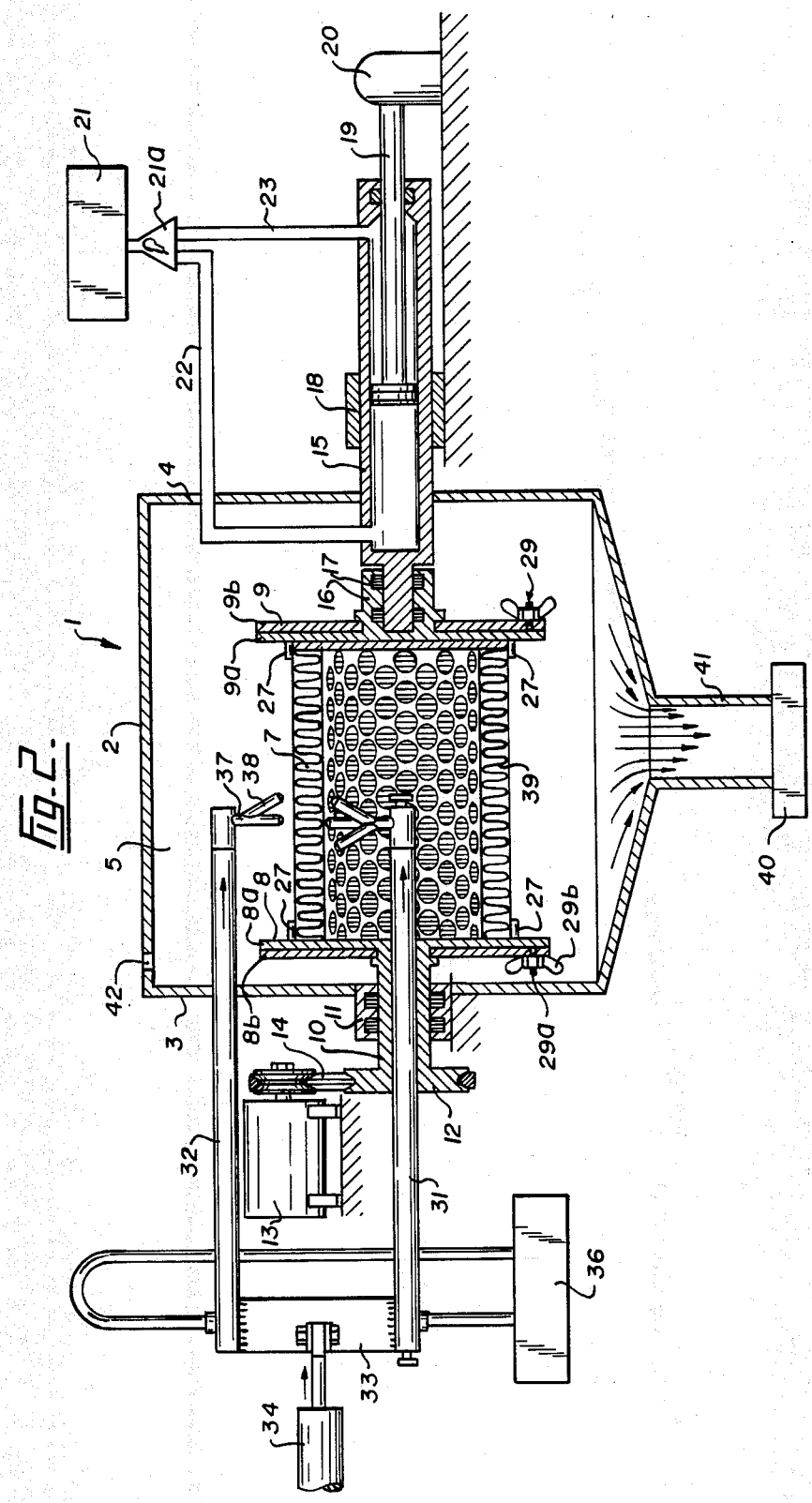
FIG. 2 is a partly schematic, plan sectional view of the cleaner assembly.
Figure 3:
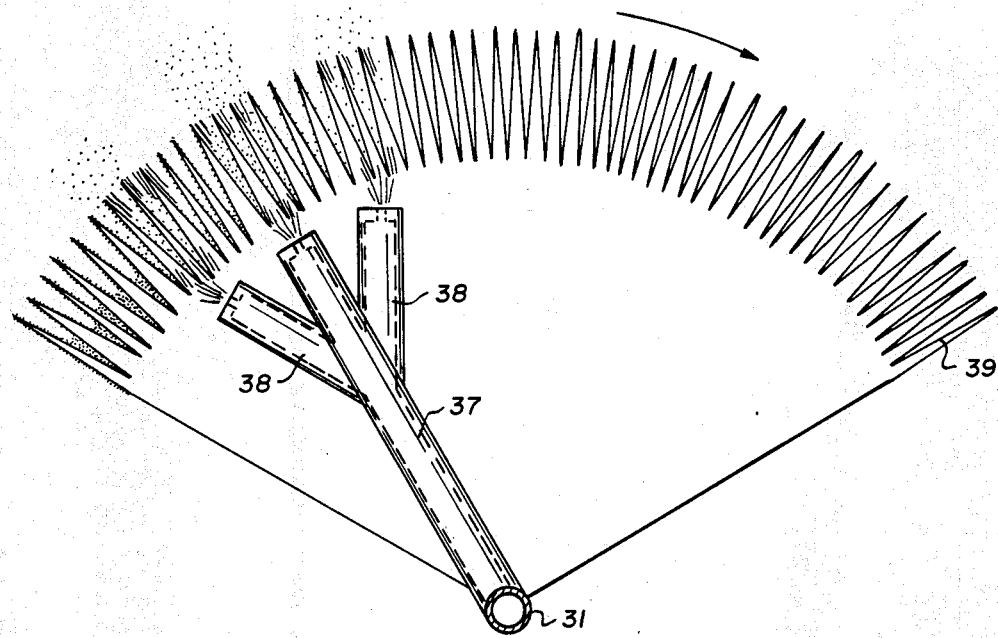
FIG. 3 is an end view showing part of the filter wall and a nozzle group.

The cleaner assembly 1 comprises a horizontal cylindrical cabinet 2 having end walls 3, 4. The cabinet 2 forms an interior cleaning chamber 5. A door 6 provides access to the chamber 5, for insertion and removal of filters 7.

The Filter Gripping and Spinning Means

A pair of plate assemblies 8, 9 are mounted in the chamber 5, for gripping the filter 7 at its ends and spinning it. Each such assembly comprises a pair of locked-together, flat plates extending in a vertical plane. The two plate assemblies 8, 9 are coaxial.

The left plate assembly 8 is mounted on a horizontally extending, hollow shaft 10. This shaft 10 is rotatable, being supported by bearing 11, which is supported by the cabinet end wall 3. A drive sheave 12 is secured to the shaft 10. A variable speed, reversible motor 13 is provided to drive the sheave 12 through the belt 14. In summary, therefore, the left plate assembly 8 is adapted to be rotated in either direction at a controlled, variable speed.

The right plate assembly 9 is arranged for free-wheeling rotation on a horizontally extending, axially extendable, non-rotating double-acting cylinder 15. More particularly, the plates 9a, 9b of the assembly 9 are mounted on a hub 16 extending over the left end of cylinder 15. The hub 16 is supported for rotation by the bearings 17. The cylinder 15 extends outwardly to the right through the cabinet end wall 4. It is supported by the sleeve 18 and its piston 19 is pivotally secured to a stop 20. A hydraulic pressure tank 21, supplied by a pump (not shown), functions to supply fluid through a valve 21a to the cylinder 15 through one of the lines 22, 23 to move the plate assembly 9 to the left or right, as required.

In summary, the right plate assembly 9 is free to rotate and can be controllably moved toward or away from the left plate assembly 8, to vary the spacing between them, as required to accommodate the filter 7. When the valve 21a is turned off, the spacing is fixed, as the right plate assembly 9 cannot then be shifted in either direction.

Figure 5:
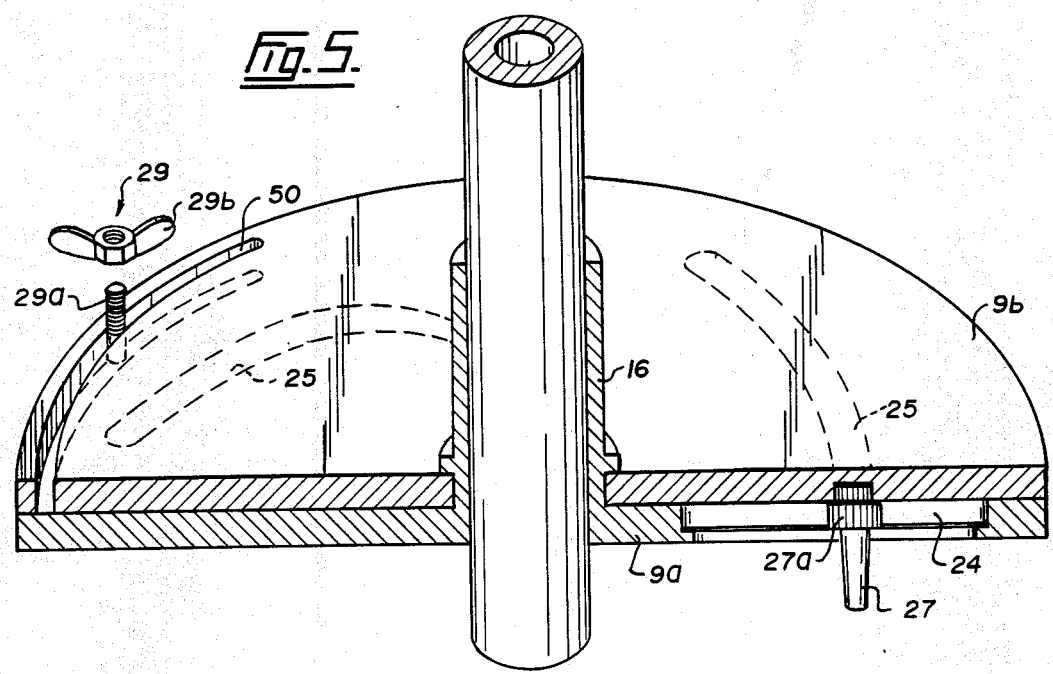
FIG. 5 is a perspective partly sectional view showing the details of a plate assembly.
Figure 4:
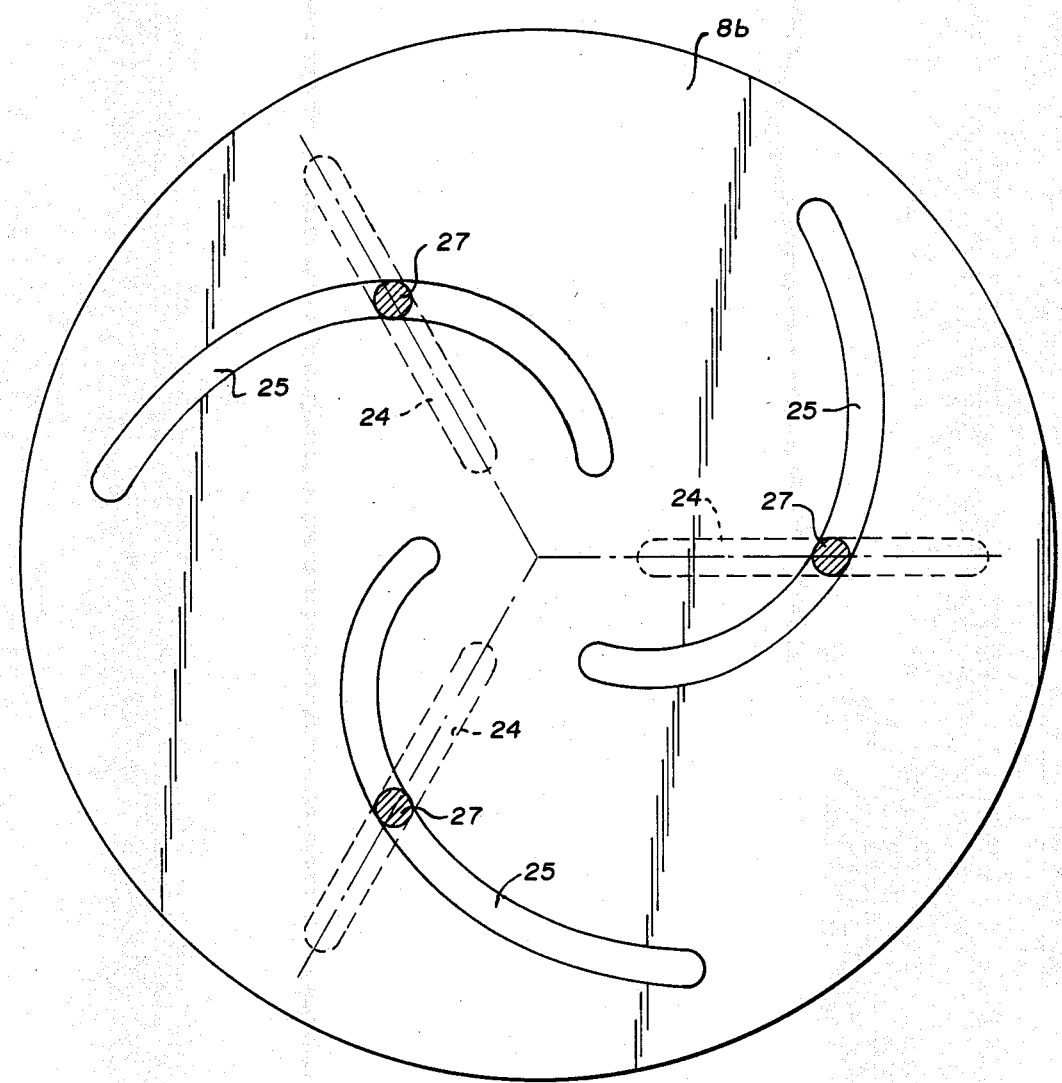
FIG. 4 is a plan view showing the rear plate.

The plate assemblies 8, 9 are arranged to quickly and accurately centralize the filter 7 and to restrain it against lateral displacement when it is being spun. More particularly, the plate assemblies 8, 9 each comprise front and rear plates 8a, 8b and 9a, 9b respectively. The front plates 8a and 9a are fixed to the shaft 10 and hub 16 respectively. The rear plates 8b and 9b are rotatably mounted on the shaft 10 and hub 16 respectively and can be turned manually. Each front plate 8a, 9a has three equidistant, identical, linear slots 24 arranged 120° apart and extending from a common concentric inner radius to an outer radius. Each rear plate 8b, 9b has three equidistant, identical, curved slots 25 arranged to run from the same concentric inner radius to the same outer radius, as is the case with the slots 24. The front plate slots 24 are of greater width than the rear plate slots 25, as indicated in FIG. 5. Pins 27, having bearings 27a, which are positioned in the slots 24, 25 and through the front plates 9a. Bolt and nut assemblies 29 are provided to lock each of the pairs of plates 8a, 8b and 9a, 9b together, thereby fixing the positions of the pins 27. More particularly, a bolt 29a extends rearwardly from each front plate 8a, 9a through a slot 50 formed in the rear plate. A wing nut 29b can be screwed down to lock the front and rear plates together.

In summary, the filter 7 can be inserted between the front plates 8a, 9a. The right front plate 9a can then be advanced to the left by acuating pump 21. When the filter 7 is firmly gripped between the front plates, the valve 21a is turned off. The rear plates 8b, 9b are then manually rotated to simultaneously move the pins 27 inwardly to abut the side wall of the filter 7, while simultaneously centering it. The bolt and nut assemblies 29 are then tightened to lock the pins 27 and the pair of plates. As a result, the pins 27 function to hold the filter 7 in a centralized position, coaxial with the plate assemblies 8, 9 during spinning.

The Nozzle Assembly

A horizontally extending, first air tube 31 extends concentrically through the drive shaft 10 and is slidable longitudinally back and forth in said shaft. The right end of the first air tube 31 is thus positioned within the central bore of a filter 7, when the latter is in place between the plate assemblies 8, 9.

A second air tube 32 is disposed parallel and coextensive with the first air tube 31. Said second air tube 32 extends through the cabinet end wall 3 at an elevation such that it lies close to the outer surface of the filter 7.

The two air tubes 31, 32 are secured at their left ends to a cross member 33. A double-acting hydraulic cylinder 34 is also secured to the cross member 33, for reciprocating the tubes 31, 32. A hydraulic pump 35 is provided to actuate the cylinder 34. The pump 35 is provided with suitable controls, not shown, to cause it to reciprocate the air tubes 31, 32 at a pre-determined frequency and rate.

A compressor 36 is provided to supply pressurized air to the first and second air tubes 31, 32.

Attached to the right end of each air tube 31, 32 is a radially extending tube 37 which terminates in a plurality of nozzles 38. The two groups of nozzles 38 are close coupled to the inner and outer surfaces of the filter paper 39. The three nozzles of each group are arranged angularly, so that their jets will impact closely adjacent to, but spaced apart, portions of the pleated filter paper 39—this arrangement results in some vibration of the paper, which assists in dislodgement of the dust.

The nozzles 38 can vary in size and configuration—we typically use a nozzle having a bar-type 3/32" outlet and supply 12 CFM of air to it at a pressure of about 40 psi (for small filters) to about 120 psi (for large filters).

In summary, the first or inner air tube 31 is adapted to be reciprocated back and forth along the length of the spinning filter 7. The nozzles 38 provide close-coupled, localized jets of air which are found to be effective to dislodge the dirt on the outer side of the filter paper 39.

The second or outer tube 32 is not as important as the first. However its jets of air do assist in vibrating the filter paper 39. Also, the outside jets will loosen dirt clinging to the outside surface of the filter paper. The inside jets then blow the loosened dirt free of the paper.

Suction

A suction fan 40 is connected through a duct 41 with the cabinet 2. Openings 42 are also provided in the cabinet 2.

The fan 40 functions to remove not only the air being injected through the nozzles 38, but also the flushing air entering through the cabinet openings 42. Typically we use a fan capable of removing about 3000 CFM.

Pre-Drying

The filter 7 should be dried with a warm, dry air flow until the attached dust particles are substantially moisture free, before being cleaned. We have found that, otherwise, the fine particles, which become dampened in use by the natural humidity in the air, will tend to cling tenaciously to the filter paper and to a significant extent are not dislodged during cleaning. Once dried, however, they will come off relatively easily during cleaning.

Operation

The dirty, dried filter 7 is placed between the planar plate assemblies 8, 9. The piston 19 of the cylinder 15 is extended by actuating the pump 21, to move the plate assembly 9 to the left, whereby the plate assemblies 8, 9 will firmly engage the ends of the filter 7. The rear plates 8b, 9b are then rotated manually, to cause the pins 27 to move inwardly to centralize and grip the filter 7 from the side. The bolt and nut assembly 29 and set screw 30 are tightened to fix the plate assemblies 8, 9. The motor 13 is then actuated, to spin the filter 7. The air compressor 36 is actuated to commence pumping pressurized air through the nozzles 38. At the same time, the suction fan 40 is actuated to draw dusty air from the cabinet 2. The pump is then actuated to reciprocate the air tubes 31, 32 and their nozzles 38 along the inner surface of the filter 7, to clean the latter.

The embodiments of the invention in which an exclusive property or privilege is claimed are defined as follows:

1. A cleaner assembly for dry cleaning a generally tubular air filter having a pleated paper filter medium therein on which dust has collected, comprising:
    (a) means for spinning the filter about its longitudinal axis;
    (b) means for applying one or more localized, close-coupled jets of pressurized air generally radially to the inner surface of the spinning filter, to dislodge the dust attached to the exterior of the filter paper and immediately in the path of said jet;
    (c) means for supplying pressurized air to said means (b); and
    (d) means for applying suction to the exterior of the spinning filter during air cleaning, to draw off dust-laden air.

2. A cleaner assembly for dry cleaning a generally tubular air filter having a pleated paper filter medium therein on which dust has collected, comprising:
    (a) a cabinet forming a cleaning chamber;
    (b) means for spinning the filter in the chamber about the filter's longitudinal axis;

(c) means for applying one or more localized, close-coupled jets of pressurized air generally radially to the inner surface of the spinning filter, to dislodge the dust attached to the exterior of the filter paper and immediately in the path of said jet;

(d) means for supplying pressurized air to said means (c);

(e) means for reciprocating one of the means (b) and the filter, relative to the other longitudinally, whereby substantially all of the filter wall may be subjected to reverse air flow; and (f) means, associated with the cabinet, for applying suction to the exterior of the spinning filter during air cleaning, to draw off dust-laden air.

3. A cleaner assembly for dry cleaning a generally tubular air filter having a pleated paper filter medium therein on which dust has collected, comprising:

(a) a cabinet forming a cleaning chamber;

(b) means, associated with the cabinet, for applying suction to the chamber;

(c) a pair of spaced apart, generally planar plate assemblies, rotatably mounted in the chamber, for gripping the filter between said plate assemblies and spinning it about its longitudinal axis, at least one of the plate assemblies being controllably moveable toward the other, so that filters of varying lengths can be gripped therebetween;

(d) means for biasing at least one of the plate assemblies toward the other, to vary their spacing;

(e) means for driving at least one of the plate assemblies, to spin the filter;

(f) a plurality of circularly arranged pin-like members, upstanding from the gripping surface of each plate assembly and concentric therewith;

(g) means, associated with the plate assemblies, for moving said pin-like members together an equal distance in or out relative to the centre of the plate assembly, whereby said pin-like members are operative to centralize the filter and prevent it from shifting during spinning;

(h) means, associated with the plate assemblies, for locking the pin-like members against movement to fix them in a gripping position, when required;

(i) a hollow shaft associated with the cabinet and adapted to extend through one of the plate assemblies in generally coaxial relationship therewith, said shaft carrying at least one generally radially directed nozzle having its outlet positioned so as to be close coupled to the inner surface of the filter;

(j) means for reciprocating the shaft, whereby the nozzle is moveable along substantially the full length of the filter; and (k) means for supplying pressurized air to the shaft.

4. A method for removing dust from the outer surface of the pleated paper filter medium of a generally tubular air filter comprising:

(a) drying the filter with dry air until the dust is substantially dry;

(b) then spinning the dry filter about its longitudinal axis in a cabinet;

(c) applying a localized, close-coupled air jet to the inside surface of the spinning filter to clean a small area of the filter wall directly in the path of the jet, and moving one of the jet and the filter relative to the other, so that the jet is applied to all or at least the major part of the surface of the filter wall; and (d) simultaneously suctioning dusty air from the cabinet.

5. The cleaner assembly as set forth in claim 1 comprising:

(f) means for applying one or more localized, close-coupled jets of pressurized air generally radially to the outer surface of the spinning filter, at the same time as the means (b) is applying the inner jet and at substantially the same locality, to assist in dislodging the dust;

said means (c) and (d) being operative to supply pressurized air to said means (f) and to reciprocate said means (f) in opposed relation to said means (b).

6. The cleaner assembly as set forth in claim 2 comprising:

(g) means for applying one or more localized, close-coupled jets of pressurized air generally radially to the outer surface of the spinning filter, at the same time as the means (c) is applying the inner jet and at substantially the same locality, to assist in dislodging the dust;

said means (d) and (e) being operative to supply pressurized air to said means (g) and to reciprocate said means (g) in opposed relation to said means (c).

7. The method as set forth in claim 4 comprising:

applying a localized, close-coupled air jet to the outside surface of the spinning filter at the same time as the inside jet is being applied and in substantially opposed relation thereto.

* * * * *